(12) United States Patent  
Charlier et al.

(10) Patent No.: US 9,232,366 B1  
(45) Date of Patent: Jan. 5, 2016

(54) DUAL-WATCH COLLAR-WEARABLE COMMUNICATION DEVICE

(71) Applicant: MOTOROLA SOLUTIONS, INC, Schaumburg, IL (US)

(72) Inventors: Michael L. Charlier, Palatine, IL (US); Christopher A. Evans, Chicago, IL (US); Charles B. Harmke, Huntley, IL (US); Chi T Tran, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 14/515,080

(22) Filed: Oct. 15, 2014

(51) Int. Cl.
*H04W 4/10* (2009.01)
*H04R 1/10* (2006.01)

(52) U.S. Cl.
CPC ............... *H04W 4/10* (2013.01); *H04R 1/1041* (2013.01)

(58) Field of Classification Search
CPC ......... H04W 4/08; H04W 4/10; H04R 1/1041
USPC .................................................. 455/518–521
See application file for complete search history.

(56) References Cited

U.S. PATENT DOCUMENTS

| 4,084,139 | A | 4/1978 | Jakobe |
| 5,457,751 | A | 10/1995 | Such |
| 5,884,198 | A | 3/1999 | Kese et al. |
| 7,570,977 | B2 | 8/2009 | Gantz et al. |
| 7,587,227 | B2 | 9/2009 | Cheung et al. |
| 7,720,234 | B1 | 5/2010 | Winslow et al. |
| 8,571,611 | B2 | 10/2013 | Solomon |
| 8,577,064 | B2 | 11/2013 | Wax |
| 8,718,295 | B2 | 5/2014 | Sung et al. |
| 8,787,584 | B2 | 7/2014 | Nystrom et al. |
| 2004/0001588 | A1 | 1/2004 | Hairston |
| 2006/0177086 | A1 | 8/2006 | Rye et al. |
| 2012/0063619 | A1 | 3/2012 | Hildebrandt et al. |
| 2013/0301860 | A1 | 11/2013 | Neumeyer et al. |
| 2014/0081631 | A1 | 3/2014 | Zhu et al. |

OTHER PUBLICATIONS

International Application No. PCT/CN2014/088106, as filed Oct. 6, 2014—Motorola Solutions, Inc.

*Primary Examiner* — Raymond Dean
(74) *Attorney, Agent, or Firm* — Barbara R. Doutre (57) ABSTRACT

Disclosed herein are embodiments of a dual-watch collar-wearable communication device. One embodiment takes the form of a system that includes left-side and right-side audio speakers, a microphone, left-side and right-side push-to-talk (PTT) buttons and a controller programmed to carry out a set of functions. The set of functions include routing audio received via a first channel to the left-side audio speaker, routing audio received via a second channel to the right-side audio speaker, routing audio received via the microphone via the first channel when the left-side PTT button is actuated, and routing audio received via the microphone via the second channel when the right-side PTT button is actuated.

25 Claims, 9 Drawing Sheets

DUAL-WATCH COLLAR-WEARABLE COMMUNICATION DEVICE

BACKGROUND OF THE INVENTION

It is important that public-safety responders be able to communicate with each other on a regular basis. As a result, one of the most commonly used tools in the public-safety context is a mobile radio. Mobile radios may be incorporated into or with one or more other devices such as cell phones, smartphones, tablets, notebook computers, laptop computers, and the like. Additionally, mobile radios often have accessories that enhance the functionality and dependability of the mobile radios. Accessories can include batteries, chargers, headsets, microphones, speakers, and the like. And certainly many other examples could be listed, as known to those having skill in the relevant art.

Public-safety personnel utilize mobile radios in different talkgroups so that multiple responders can simultaneously hear what one person is saying, and so that talkgroup members can respond in an easy and effective fashion. Public-safety personnel also have the need to communicate on multiple different radio channels and talkgroups. It is desirable for a public-safety responder to be able to communicate with as many allies as possible as efficiently as possible for at least the reason that the immediacy and efficacy with which public-safety responders can communicate with one another are quite often determinative with respect to how positive the ultimate outcome of a given incident can be. Accordingly, there is a need for a dual-watch collar-wearable communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are embodiments of a dual-watch collar-wearable communication device, also referred to herein at times for brevity as a collar device. One embodiment takes the form of a system that includes left-side and right-side audio speakers, a microphone, left-side and right-side push-to-talk (PTT) buttons and a controller programmed to carry out a set of functions. The set of functions includes routing audio received via a first channel to the left-side audio speaker, routing audio received via a second channel to the right-side audio speaker, routing audio received via the microphone via the first channel when the left-side PTT button is actuated, and routing audio received via the microphone via the second channel when the right-side PTT button is actuated.

Another embodiment takes the form of a method carried out by a collar device. The collar device comprises left-side and right-side audio speakers, a microphone, and left-side and right-side PTT buttons. In the example method, audio received via a first channel is routed to the left-side audio speaker and audio received via a second channel is routed to the right-side audio speaker. Additionally, audio received via the microphone is routed via the first channel when the left-side PTT button is actuated and audio received via the microphone is routed to via the second channel when the right-side PTT button is actuated.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, one or both of the left-side speaker and the right-side speaker includes an on-collar speaker. In at least one such embodiment, the on-collar speaker includes an acoustic speaker; in at least one such embodiment, the on-collar speaker includes a directional ultrasonic speaker.

In at least one embodiment, one or both of the left-side speaker and the right-side speaker includes an in-ear speaker.

In at least one embodiment in which one or both of the left-side speaker and the right-side speaker includes an in-ear speaker, the in-ear speaker includes a wireless in-ear speaker. In at least one such embodiment, the wireless in-ear speaker includes a gravity sensor, and the set of functions further includes (i) using the gravity sensor to determine a gravitational orientation of the wireless in-ear speaker, (ii) correlating the wireless in-ear speaker to either the left ear or the right ear based on the determined gravitational orientation, (iii) routing audio received via the first channel to the wireless in-ear speaker if the wireless in-ear speaker is correlated to the left ear, and (iv) routing audio received via the second channel to the wireless in-ear speaker if the wireless in-ear speaker is correlated to the right ear.

In at least one embodiment in which one or both of the left-side speaker and the right-side speaker includes an in-ear speaker, the in-ear speaker includes a wired in-ear speaker.

In at least one embodiment in which one or both of the left-side speaker and the right-side speaker includes an in-ear speaker, the microphone includes a component microphone of the in-ear speaker.

In at least one embodiment in which one or both of the left-side speaker and the right-side speaker includes an in-ear speaker, the collar device includes a dock configured to receive the in-ear speaker. In at least one such embodiment, the dock includes a charging dock.

In at least one embodiment in which one or both of the left-side speaker and the right-side speaker includes an in-ear speaker, the set of functions includes sensing an in-ear position of the in-ear speaker and responsively activating the in-ear speaker.

In at least one embodiment in which one or both of the left-side speaker and the right-side speaker includes an in-ear speaker, one or both of the left-side speaker and the right-side speaker further includes an on-collar speaker. In at least one such embodiment, the on-collar speaker includes an acoustic speaker; in at least one such embodiment, the on-collar speaker includes a directional ultrasonic speaker.

In at least one embodiment in which (i) one or both of the left-side speaker and the right-side speaker includes an in-ear speaker and (ii) one or both of the left-side speaker and the right-side speaker includes an on-collar speaker, the set of functions further includes (i) routing audio received via one of the first and second channels via the corresponding in-ear speaker and (ii) routing audio received via the other of the first and second channels via the corresponding on-collar speaker.

In at least one embodiment, the collar-wearable communication device further includes (i) left-side and right-side volume controls, (ii) left-side and right-side in-ear-speaker volume settings; and (iii) left-side and right-side on-collar-speaker volume settings, and the set of functions further includes (i) adjusting the left-side in-ear-speaker volume setting responsive to the left-side volume control when the left-side in-ear speaker is in an in-ear position, (ii) adjusting the left-side on-collar-speaker volume setting responsive to the left-side volume control when the left-side in-ear speaker is not in an in-ear position, (iii) adjusting the right-side in-ear-speaker volume setting responsive to the right-side volume control when the right-side in-ear speaker is in an in-ear position, and (iv) adjusting the right-side on-collar-speaker volume setting responsive to the right-side volume control when the right-side in-ear speaker is not in an in-ear position.

In at least one embodiment in which (i) one or both of the left-side speaker and the right-side speaker includes an in-ear speaker and (ii) one or both of the left-side speaker and the right-side speaker includes an on-collar speaker, the set of functions includes (i) routing audio received via the first channel to the left-side in-ear speaker when the left-side in-ear speaker is in an in-ear position, (ii) routing audio received via the first channel to the left-side on-collar speaker when the left-side in-ear speaker is not in an in-ear position, (iii) routing audio received via the second channel to the right-side in-ear speaker when the right-side in-ear speaker is in an in-ear position, and (iv) routing audio received via the second channel to the right-side on-collar speaker when the right-side in-ear speaker is not in an in-ear position.

In at least one embodiment, one or both of the left-side speaker and the right-side speaker includes a directional ultrasonic speaker.

In at least one embodiment, the collar device further includes one or both of a left-side volume control and a right-side volume control, and the set of functions further includes (i) adjusting a volume level of the left-side speaker responsive to the left-side volume control and (ii) adjusting a volume level of the right-side speaker responsive to the right-side volume control.

In at least one embodiment, the set of functions further includes detecting a level of acoustic loading on one or both of the left-side speaker and the right-side speaker, and responsively adjusting a volume level of one or both of the left-side speaker and the right-side speaker.

In at least one embodiment, the microphone includes left-side and right-side microphones.

In at least one embodiment in which the microphone includes left-side and right-side microphones, both the left-side microphone and the right-side microphone are associated with both the left-side PTT button and the right-side PTT button.

In at least one embodiment in which the microphone includes left-side and right-side microphones, the left-side microphone is associated with the left-side PTT button, and the right-side microphone is associated with the right-side PTT button.

In at least one embodiment, the collar device further includes a first receiver associated with the first channel and a second receiver associated with the second channel. In at least one such embodiment, the first and second receivers are respectively associated with first and second local wireless connections to a mobile radio.

In at least one embodiment, the set of functions further includes routing audio received via the microphone via both the first channel and the second channel when both the left-side PTT button and the right-side PTT button are actuated. In at least one such embodiment, routing audio received via the microphone via both the first channel and the second channel includes routing the received audio over one of the first channel and the second channel, buffering the received audio, and routing the buffered audio over the other of the first channel and the second channel.

In at least one embodiment, the collar-wearable device further includes a third PTT button, and the set of functions further includes routing audio received via the microphone via both the first channel and the second channel when the third PTT button is actuated. In at least one such embodiment, routing audio received via the microphone via both the first channel and the second channel further includes routing the received audio over one of the first channel and the second channel, buffering the received audio, and routing the buffered audio over the other of the first channel and the second channel.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

Figure 1:
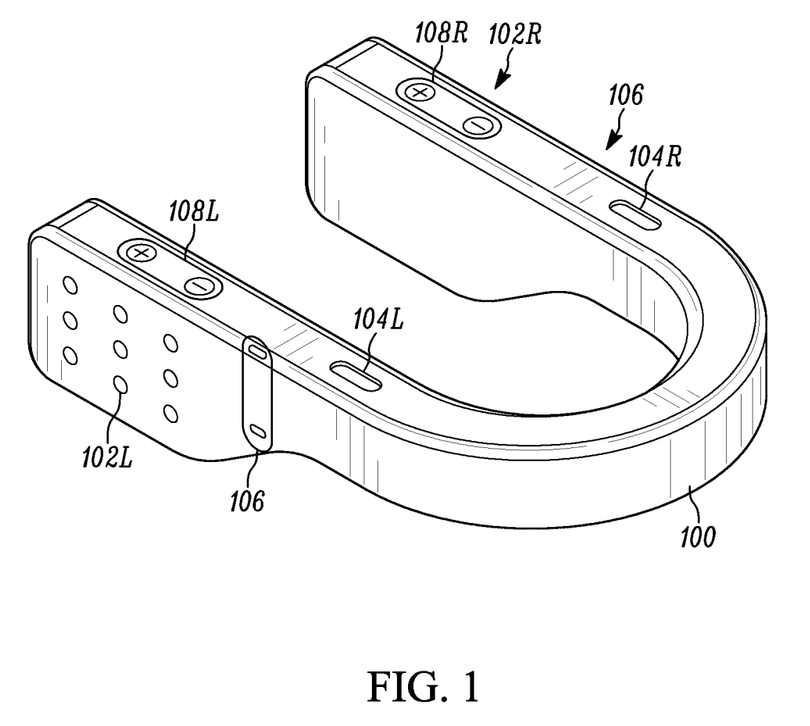
FIG. 1 depicts a first example dual-watch collar-wearable communication device, in accordance with an embodiment.

FIG. 1 depicts a first example collar device, in accordance with an embodiment. In particular, FIG. 1 depicts a collar device 100. In the embodiment that is depicted in FIG. 1, the collar device 100 includes a left-side PTT button 102L, a right-side PTT button 102R, a left-side audio speaker 104L, a right-side audio speaker 104R, and a microphone 106. In at least one embodiment, the microphone 106 includes left-side and right-side microphones. In at least one embodiment, including the embodiment that is depicted in FIG. 1, the collar device 100 also includes a left-side volume control 108L and a right-side volume control 108R.

Figure 2:
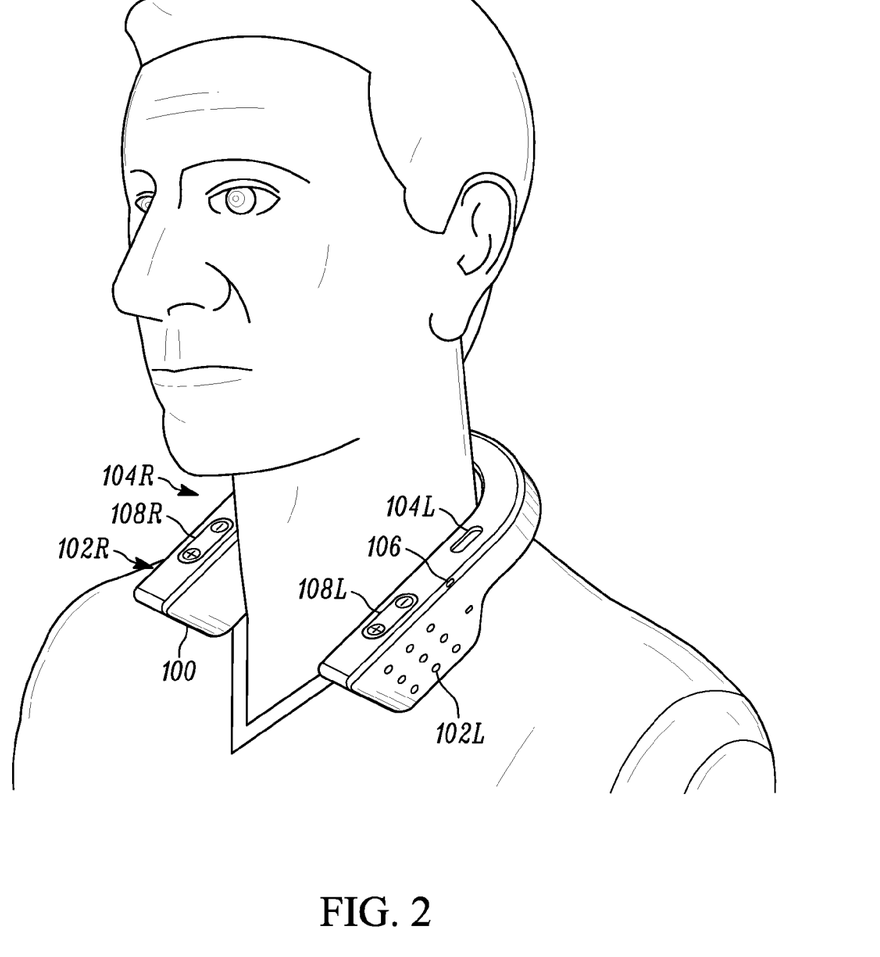
FIG. 2 depicts the example dual-watch collar-wearable communication device of FIG. 1 being worn by an example user, in accordance with an embodiment.

FIG. 2 depicts the example collar device of FIG. 1 being worn by an example user, in accordance with an embodiment. That is, FIG. 2 shows a user wearing the collar device 100. In FIG. 2, the left-side PTT button 102L, the left-side audio speaker 104L, and the left-side volume control 108L are positioned toward the left side of the user's body, while the right-side PTT button 102R, the right-side audio speaker 104R, and the right-side volume control 108R are positioned toward the right side of the user's body. Though only explicitly labeled in FIG. 2 on the left side of the user's body, parts of the microphone 106 (i.e., microphones making up respective parts of the microphone system that is referred to herein as microphone 106) are positioned on both the left and right sides of the user's body.

Figure 3:
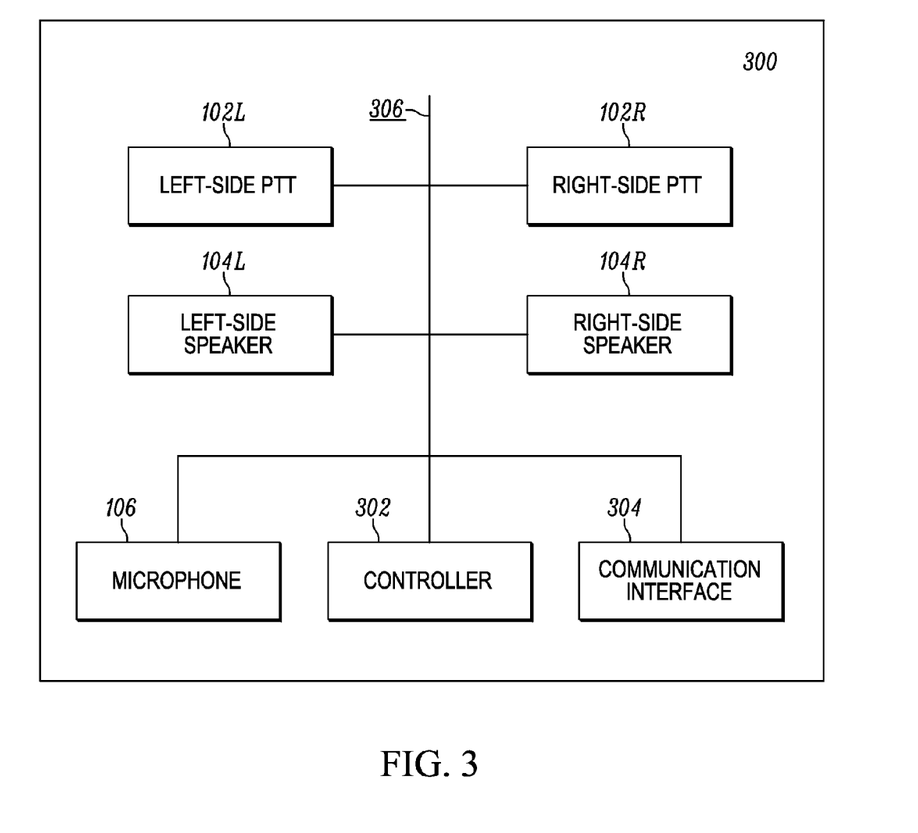
FIG. 3 depicts a second example dual-watch collar-wearable communication device, in accordance with an embodiment.

FIG. 3 depicts a second example collar device, in accordance with an embodiment. In particular, FIG. 3 depicts the components of a collar device 300. In at least one embodiment, the collar device 100 has an architecture similar to that depicted in and described in connection with FIG. 3. In the embodiment that is depicted in FIG. 3, the collar device 300 includes several of the components of the collar device 100; in particular, the collar device 300 includes the left-side and right-side PTT buttons 102L and 102R, the left-side and right-side audio speakers 104L and 104R, and the microphone 106. The collar device 300 also includes a controller 302, a communication interface 304, and a system bus 306.

The controller 302 is programmed to carry out a set of functions. The set of functions includes (i) routing audio received via a first channel to the left-side audio speaker 104L, (ii) routing audio received via a second channel to the right-side audio speaker 104R, (iii) routing audio received via the microphone 106 via the first channel when the left-side PTT button 102L is actuated, and (iv) routing audio received via the microphone 106 via the second channel when the right-side PTT button 102R is actuated.

In some embodiments, the microphone 106 is a system of microphones, the system including a plurality of individual microphones located throughout the collar device. In at least one embodiment, each individual microphone of the plurality is capable of detecting audio and responsively producing a corresponding respective audio signal, which the respective microphone may transmit to the controller 302 for further processing. The controller 302 may then combine those individual audio signals into a combined audio signal. The controller 302 may use the inputs from the various microphones to determine a position (i.e., location, orientation, and/or the like) of a user's mouth, and may cancel noise from the individual audio signals based at least in part on that determined mouth position as one of the factors.

In at least one embodiment, the communication interface 304 includes a radio transmitter and a receiver. The communication interface 304 may be configured to be operable for communicating according to one or more wireless-communication protocols, some examples of which include LTE, APCO P25, ETSI DMR, TETRA, WiFi, Bluetooth, and the like. The communication interface 304 may also include one or more wired-communication interfaces (for communicating according to, e.g., Ethernet, USB, and or one or more other protocols.) As such, the communication interface 304 may include any necessary hardware (e.g., chipsets, antennas, Ethernet cards, etc.), any necessary firmware, and any necessary software for conducting one or more forms of communication with one or more other entities.

The system bus 306 connects the various components disclosed herein. In different embodiments, the various components that are depicted in this and other examples are connected via circuitry and/or other components deemed suitable by those having skill in the relevant art for a given implementation or in a given context.

Figure 4:
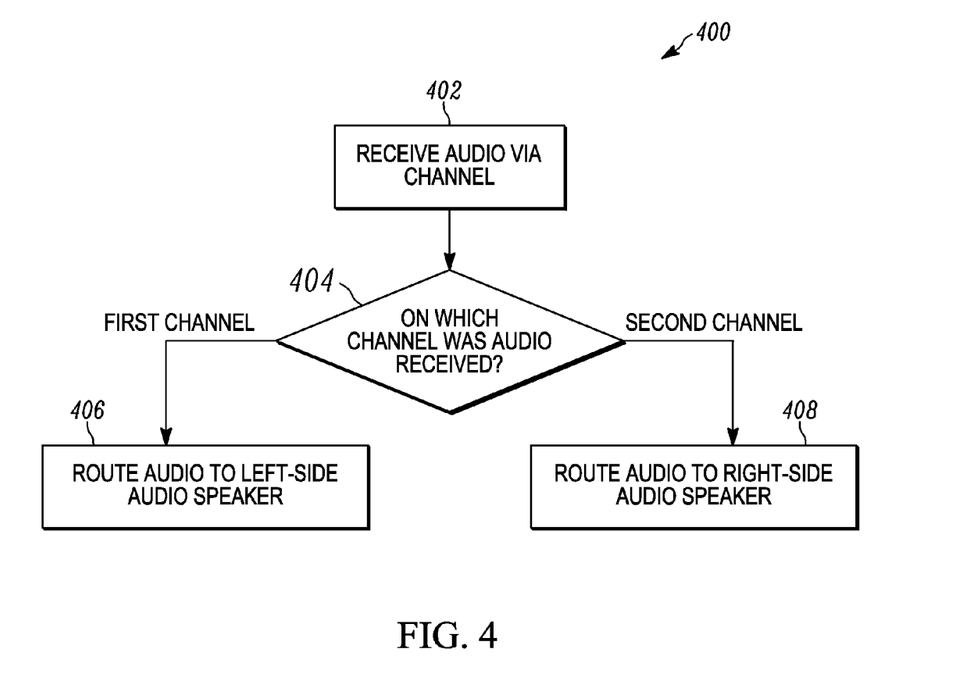
FIG. 4 depicts a first example method, in accordance with an embodiment.
Figure 5:
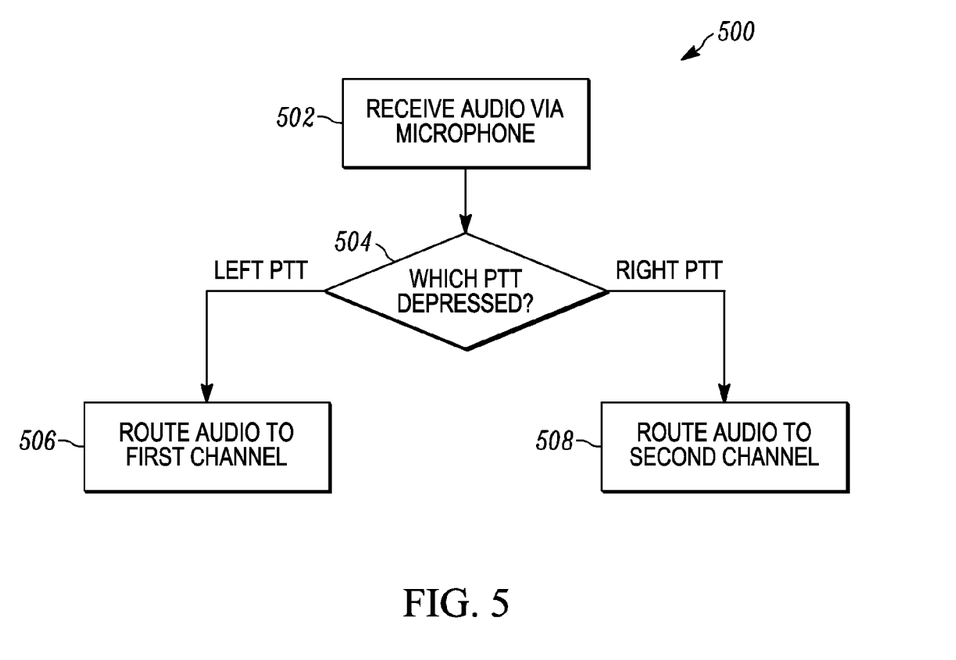
FIG. 5 depicts a second example method, in accordance with an embodiment.

FIGS. 4 and 5 depict first and second example methods, respectively, in accordance with various embodiments. In particular, FIGS. 4 and 5 depict methods 400 and 500 that various system embodiments disclosed herein are configured to perform. By way of example, and not limitation, the example system 300 is used below to describe the functions of the example methods 400 and 500.

FIG. 4 depicts the example method 400. When the example system 300 performs the example method 400, the communication interface 304 receives audio via a channel at step 402. At decision box 404, the controller 302 determines on which channel the audio was received. If audio is received on the first channel, the controller 302 routes the audio to the left-side audio speaker 104L at step 406. If audio is received on the second channel, the controller 302 routes the audio to the right-side audio speaker 104R at step 408.

FIG. 5 depicts the example method 500. When the example system 300 performs the example method 500, the microphone 106 receives audio at step 502. At decision box 504, the controller determines which PTT button is actuated (e.g., "depressed" to use the language of FIG. 5). If the left-side PTT button 102L is actuated, the controller 302 routes the audio via the first channel at step 506. If the right-side PTT button 102R is actuated, the controller 302 routes the audio via the second channel at step 508. The communication interface 304 transmits the audio on the respective channel.

The example methods 400 and 500 may occur simultaneously, both routing audio from the microphone to a designated channel and from a channel to the designated speaker. In some such embodiments, sound received by the microphone that was emitted from either the left-side or the right-side speaker is canceled from the audio signal received by the microphone. In other such embodiments, sound received via the channel is buffered when either the left-side or the right-side PTT button is actuated. When the associated PTT button is released, the example method 400 resumes and plays the buffered audio to the associated speaker. And certainly other example implementations could be listed as well.

In some embodiments, one or both of the left-side speaker 104L and the right-side speaker 104R includes an in-ear speaker. The descriptions and figures disclosed herein depict a single in-ear speaker by way of simplification. In some embodiments, an in-ear speaker is associated with the just the right side, just the left side, or either or both the right side and the left side.

Figure 6:
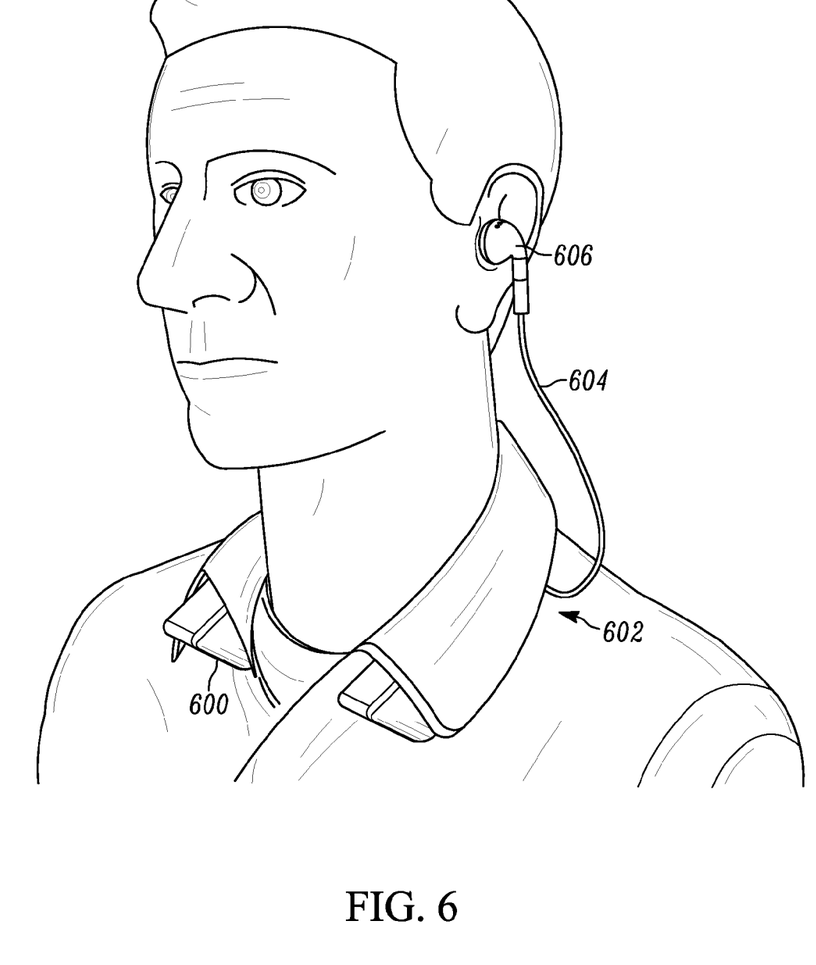
FIG. 6 depicts a third example dual-watch collar-wearable communication device being worn by an example user, in accordance with an embodiment.

FIG. 6 depicts a third example collar device being worn by an example user, in accordance with an embodiment. More generally, FIG. 6 depicts an example system that includes a collar device 600 that similar to the example collar devices 100 and 300 that are described above, and that also includes a wire interface 602, a wire 604, and an in-ear speaker 606. The wire interface 602 can be a hard-wired interface, a pluggable interface, or any other method known by those with skill in the relevant art. The wire 604 attaches to the wire interface 602 at one end and the in-ear speaker 606 at the other end. The in-ear speaker 606 plays audio from the associated channel.

Figure 7:
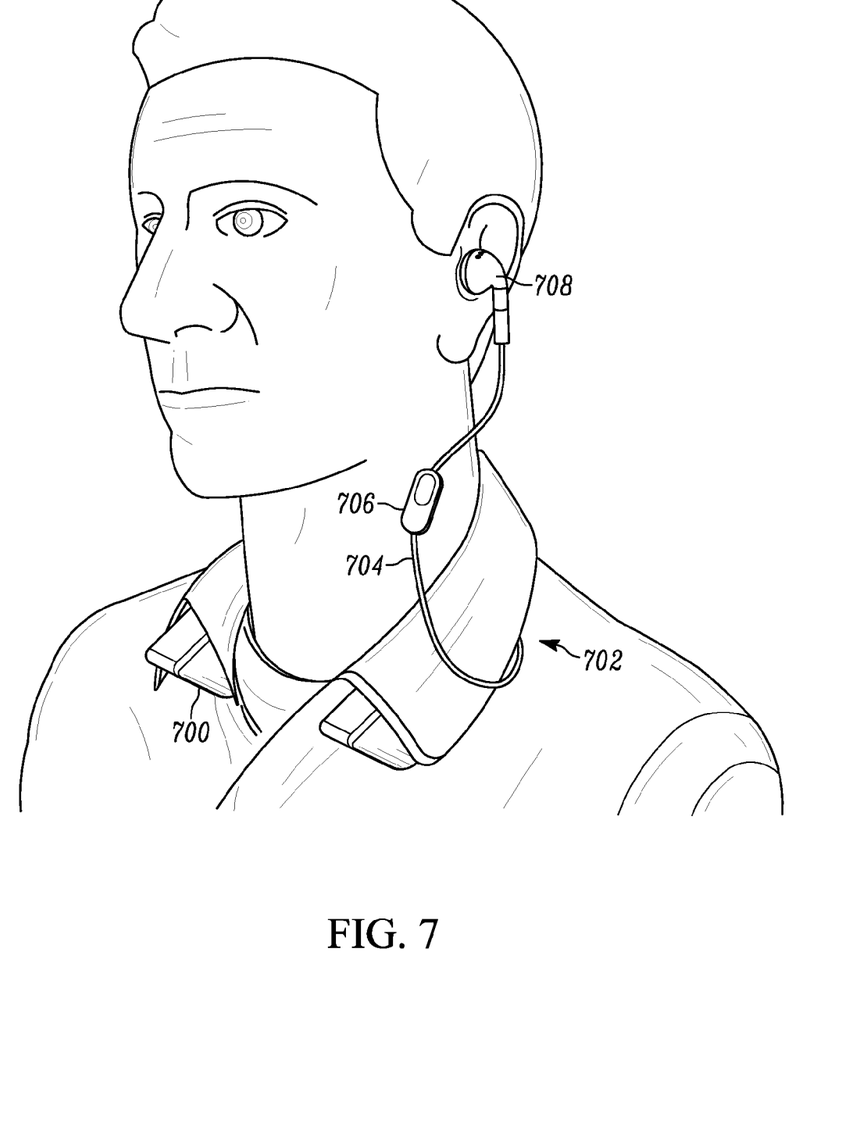
FIG. 7 depicts a fourth example dual-watch collar-wearable communication device being worn by an example user, in accordance with an embodiment.

FIG. 7 depicts a fourth example collar device being worn by an example user, in accordance with an embodiment. More generally, FIG. 7 depicts an example system that includes a collar device 700 that is similar to the example collar devices 100, 300, and 600 that are described above, and that also includes a wire interface 702 (which may be similar to the wire interface 602), a wire 704 (which may be similar to the wire 604), a component microphone 706 (which in at least some embodiments is considered to be part of the microphone 106), and an in-ear speaker 708 (which may be similar to the in-ear speaker 606). In such an embodiment, the wire interface 602 connects to the collar device and the wire 604 as disclosed above.

Figure 8:
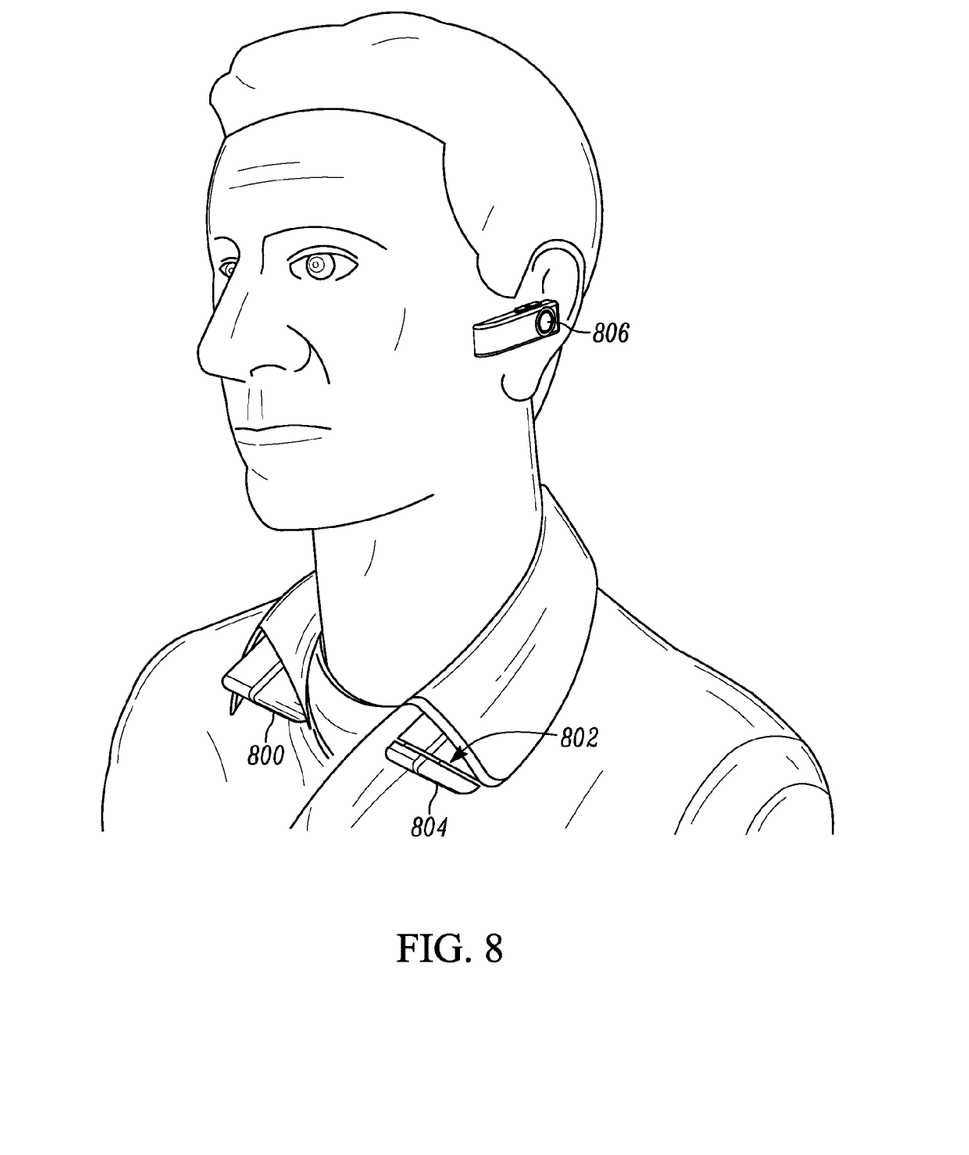
FIG. 8 depicts a fifth example dual-watch collar-wearable communication device being worn by an example user, in accordance with an embodiment.

FIG. 8 depicts a fifth example collar device being worn by an example user, in accordance with an embodiment. More generally, FIG. 8 depicts an example system that includes a collar device 800 that is similar to the example collar devices 100, 300, 600, and 700 that are described above, and that also includes a receiver dock 802, a docked wireless in-ear speaker 804, and an in-position wireless in-ear speaker 806. It is explicitly noted here that FIG. 8 can be viewed either as (i) a scenario in which there are two separate wireless in-ear speakers, where one (804) is in a dock (e.g., a charging dock) in the collar device 800 and the other (806) is positioned in the user's ear or (ii) a scenario in which there is only one wireless in-ear speaker, and where the reference numeral 804 depicts that wireless in-ear speaker in a docked position while the reference numeral 806 depicts that wireless in-ear speaker in an in-ear position. In at least one embodiment, the collar device 800 includes multiple docks 804 that are collectively capable of receiving both a right-side in-ear speaker and a left-side in-ear speaker. In at least one embodiment, the collar device 800 includes one or more docks 804 capable of receiving one or more extra (i.e., spare) in-ear speakers.

The wireless in-ear speaker is connected to the collar device via one or more wireless-communication protocols, one commonly used example of which is Bluetooth. In some embodiments, the wireless in-ear speaker 804/806 includes a component microphone, which in at least some embodiments is considered to be part of the microphone 106.

In at least one embodiment, the wireless in-ear speaker includes a gravity sensor. In such embodiments, a gravitational orientation of the wireless in-ear speaker is determined using the gravity sensor. Based on the determined gravitational orientation, the wireless in-ear speaker is correlated to either the left ear or the right ear. Audio received via the first channel is routed to the wireless in-ear speaker if the wireless in-ear speaker is correlated to the left ear, and audio received via the second channel is routed to the wireless in-ear speaker if the wireless in-ear speaker is correlated to the right ear.

In at least one embodiment, one or both of the left-side speaker and the right-side speaker includes a directional ultrasonic speaker, which projects ultrasonic sound energy towards either the user's left-side or the right-side ear, as determined by the controller, and is heard as audible sound at the left ear or the right ear.

In at least one embodiment, the set of functions further includes sensing an in-ear position of the in-ear speaker and responsively activating the in-ear speaker. The in-ear position can be determined by several types of sensors, including but not limited to proximity sensors, pressure sensors, thermal sensors, and optical sensors. In at least one embodiment, in response to determining an in-ear position, the in-ear speaker is activated and the controller 302 directs audio to the in-ear speaker.

In at least one embodiment, the collar device includes both in-ear speakers and on-collar speakers for one or both of the left-side and right-side speakers. As examples, the in-ear speakers could include one or more of the in-ear speaker 606, the in-ear speaker 708, the wireless in-ear speakers 804 and 806, and/or any other speaker worn in the user's ear. The on-collar speakers are mounted on the collar device, and may include one or more of the left-side audio speaker 104L, the right-side audio speaker 104R, and directional ultrasonic speakers, as examples. In some such embodiments, the controller 302 directs audio received via one of the first and second channels via the corresponding in-ear speaker and routes audio received via the other of the first and second channels via the corresponding on-collar speaker.

In at least one embodiment, the collar device routes audio to either an in-ear speaker or an on-collar speaker based on the determined in-ear position. Audio received via the first channel is routed to the left-side in-ear speaker when the left side in-ear speaker is in an in-ear position and is routed to the left-side on-collar speaker when the left-side in-ear speaker is not in an in-ear position. Similarly, audio received via the second channel is routed to the right-side in-ear speaker when the right-side in-ear speaker is in an in-ear position and is routed to the right-side on-collar speaker when the right-side in-ear speaker is not in an in-ear position. In embodiments that also include an ultrasonic speaker, audio can also be routed to the ultrasonic speaker when the in-ear speaker is not in an in-ear position.

Moreover, triggering conditions and events other than one or more in-ear speakers being in respective in-ear positions could be used by the controller 302 when determining to which type of speaker (e.g., on-collar or in-ear) to route a given audio stream; some non-limiting examples include user-interface-based control of such routing, a docked or not-docked state of one or more in-ear speakers, and/or one or more other factors deemed suitable for a given implementation by those having skill in the relevant art.

In at least one embodiment, the collar device includes one or both of a left-side volume control and a right-side volume control. A volume level of the left-side speaker is adjusted responsive to the left-side volume control and a volume level of the right-side speaker is adjusted responsive to the right-side volume control. Both the left-side and right-side volume controls are capable of adjusting the audio level output of any of the types of speakers disclosed herein, or any types deemed suitable by those of skill in the art for a given implementation.

In at least one embodiment, the collar device further includes (i) left-side and right-side volume controls, (ii) left-side and right-side in-ear-speaker volume settings; and (iii) left-side and right-side on-collar-speaker volume settings. In at least one such embodiment, the left-side in-ear-speaker volume setting is adjusted responsive to the left-side volume control when the left-side in-ear speaker is in an in-ear position, and the left-side on-collar-speaker volume setting is adjusted responsive to the left-side volume control when the left-side in-ear speaker is not in an in-ear position. The right-side in-ear-speaker volume setting is adjusted responsive to the right-side volume control when the right-side in-ear speaker is in an in-ear position, and the right-side on-collar-speaker volume setting is adjusted responsive to the right-side volume control when the right-side in-ear speaker is not in an in-ear position.

In at least one embodiment, the collar device detects a level of acoustic loading on one or both of the left-side speaker and the right-side speaker, and responsively adjusts a volume level of one or both of the left-side speaker and the right-side speaker accordingly. The level of acoustic loading can be determined by sensing a background noise level or detecting a layer of clothing, such as a shirt collar, that interferes with the sound propagation between the speaker and the user's ear. In these embodiments, the audio level is raised when high background noise is detected or clothing interference is detected and lowered when there is no background noise detected or no clothing interference is detected.

In at least one embodiment, both a left-side microphone and a right-side microphone are associated with both the left-side PTT button 102L and the right-side PTT button 102R. In these embodiments, audio received via either the left-side microphone or the right-side microphone is routed to the associated channel when either the right-side PTT button 102R or the left-side PTT button 102R is actuated. That is, in these embodiments, the microphone is really a single microphone system, such that a user can be facing in any direction, and any audio they produce will be routed by the collar device to a channel determined by which PTT button the user is actuating at that time.

In at least one embodiment, a left-side microphone is associated with the left-side PTT button 102L, and a right-side microphone is associated with the right-side PTT button 102R. In these embodiments, only sound received via the left-side microphone is routed to the associated channel when the left-side PTT button 102L is actuated and only sound received via the right-side microphone is routed to the associated channel when the right-side PTT button 102R is actuated. And certainly other example implementations could be listed here.

In at least one embodiment, the collar device includes a first receiver associated with the first channel and a second receiver associated with the second channel. In at least one such embodiment, the first and second receivers are respectively associated with the first and second local wireless connections to a mobile radio. In at least one embodiment, the collar device has a wired connection (e.g., down the back or side of a user) to a mobile radio (e.g., a portable handheld mobile radio). And numerous other example implementations could be listed.

Figure 9:
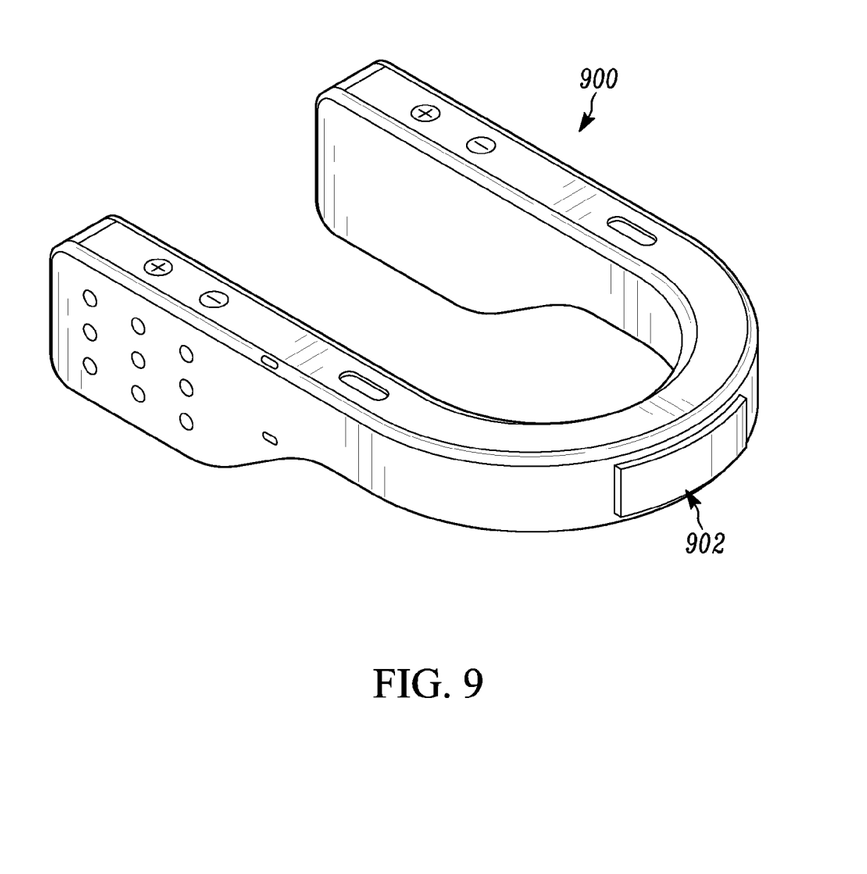
FIG. 9 depicts a sixth example dual-watch collar-wearable communication device, in accordance with an embodiment.

FIG. 9 depicts a sixth example collar device, in accordance with an embodiment. In particular, FIG. 9 depicts an example collar device 900 that is similar to the collar devices 100, 300, 600, 700, and 800 described above. The example collar device 900 includes a third PTT button 902, which by way of example and not limitation is depicted as being positioned such that, when the collar device was being worn by a user, the third PTT button 902 would be positioned near the center of the back of the user's neck. Certainly other locations on the collar device 900 could be chosen for the third PTT button 902. In at least one embodiment, audio received via the collar device's microphone is routed via both the first channel and the second channel when the third PTT button 902 is actuated. Moreover, in some embodiments, audio received via the collar device's microphone is routed via both the first channel and the second channel when the left-side PTT button 102L and the right-side PTT button 102R are both actuated; note that this could be the case whether or not a third PTT button such as the third PTT button 902 is present.

Whether initiated by (i) a left-side PTT button and a right-side PTT button both being actuated or (ii) a third PTT button 902 being actuated, routing audio to both the first and second channels can include transmitting the audio real-time on one of the two channels and transmitting a locally buffered copy of the audio on the other of the two channels. Selection of which channel gets the real-time stream and which channel gets the buffered copy could be determined randomly, by a priority ranking as between the two channels, or by any other criteria deemed suitable by those of skill in the art for a given implementation. The audio received via the microphone can be buffered in an internal data storage, which can be any type of cache, memory, or other data storage known by those with skill in the relevant art. This approach of real-time streaming on one channel and thereafter streaming a buffered copy of the received audio could be useful in implementations in which the collar device is equipped with only one transmitter, though this approach could be used in multiple-transmitter embodiments as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A dual-watch collar-wearable communication device comprising:
    left-side and right-side audio speakers;
    a microphone;
    left-side and right-side push-to-talk (PTT) buttons; and
    a controller programmed to carry out a set of functions, wherein the set of functions comprises:
        routing audio received via a first channel to the left-side audio speaker;
        routing audio received via a second channel to the right-side audio speaker;
        routing audio received via the microphone via the first channel when the left-side PTT button is actuated; and
        routing audio received via the microphone via the second channel when the right-side PTT button is actuated.

2. The dual-watch collar-wearable communication device of claim 1, wherein one or both of the left-side speaker and the right-side speaker comprises an on-collar speaker.

3. The dual-watch collar-wearable communication device of claim 2, wherein the on-collar speaker comprises an acoustic speaker.

4. The dual-watch collar-wearable communication device of claim 2, wherein the on-collar speaker comprises a directional ultrasonic speaker.

5. The dual-watch collar-wearable communication device of claim 1, wherein one or both of the left-side speaker and the right-side speaker comprises an in-ear speaker.

6. The dual-watch collar-wearable communication device of claim 5, wherein the in-ear speaker comprises a wireless in-ear speaker.

7. The dual-watch collar-wearable communication device of claim 6, wherein the wireless in-ear speaker comprises a gravity sensor, the set of functions further comprising:
    using the gravity sensor to determine a gravitational orientation of the wireless in-ear speaker;
    correlating the wireless in-ear speaker to either the left ear or the right ear based on the determined gravitational orientation of the wireless in-ear speaker;
    routing audio received via the first channel to the wireless in-ear speaker if the wireless in-ear speaker is correlated to the left ear, and
    routing audio received via the second channel to the wireless in-ear speaker if the wireless in-ear speaker is correlated to the right ear.

8. The dual-watch collar-wearable communication device of claim 5, wherein the in-ear speaker comprises a wired in-ear speaker.

9. The dual-watch collar-wearable communication device of claim 5, wherein the microphone comprises a component microphone of the in-ear speaker.

10. The dual-watch collar-wearable communication device of claim 5, further comprising a dock configured to receive the in-ear speaker.

11. The dual-watch collar-wearable communication device of claim 10, wherein the dock comprises a charging dock.

12. The dual-watch collar-wearable communication device of claim 5, the set of functions further comprising sensing an in-ear position of the in-ear speaker and responsively activating the in-ear speaker.

13. The dual-watch collar-wearable communication device of claim 5, wherein one or both of the left-side speaker and the right-side speaker further comprises an on-collar speaker.

14. The dual-watch collar-wearable communication device of claim 13, the set of functions further comprising:
    routing audio received via one of the first and second channels via the corresponding in-ear speaker; and
    routing audio received via the other of the first and second channels via the corresponding on-collar speaker.

15. The dual-watch collar-wearable communication device of claim 13, the set of functions further comprising:
    routing audio received via the first channel to the left-side in-ear speaker when the left-side in-ear speaker is in an in-ear position;
    routing audio received via the first channel to the left-side on-collar speaker when the left-side in-ear speaker is not in an in-ear position;
    routing audio received via the second channel to the right-side in-ear speaker when the right-side in-ear speaker is in an in-ear position; and
    routing audio received via the second channel to the right-side on-collar speaker when the right-side in-ear speaker is not in an in-ear position.

16. The dual-watch collar-wearable communication device of claim 15, further comprising:
    left-side and right-side volume controls;
    left-side and right-side in-ear-speaker volume settings; and
    left-side and right-side on-collar-speaker volume settings, the set of functions further comprising:
        adjusting the left-side in-ear-speaker volume setting responsive to the left-side volume control when the left-side in-ear speaker is in an in-ear position;
        adjusting the left-side on-collar-speaker volume setting responsive to the left-side volume control when the left-side in-ear speaker is not in an in-ear position;

adjusting the right-side in-ear-speaker volume setting responsive to the right-side volume control when the right-side in-ear speaker is in an in-ear position; and adjusting the right-side on-collar-speaker volume setting responsive to the right-side volume control when the right-side in-ear speaker is not in an in-ear position.

17. The dual-watch collar-wearable communication device of claim 1, further comprising one or both of a left-side volume control and a right-side volume control, the set of functions further comprising:

adjusting a volume level of the left-side speaker responsive to the left-side volume control; and adjusting a volume level of the right-side speaker responsive to the right-side volume control.

18. The dual-watch collar-wearable communication device of claim 1, the set of functions further comprising:

detecting a level of acoustic loading on one or both of the left-side speaker and the right-side speaker, and responsively adjusting a volume level of one or both of the left-side speaker and the right-side speaker.

19. The dual-watch collar-wearable communication device of claim 1, further comprising:

a first receiver associated with the first channel; and a second receiver associated with the second channel.

20. The dual-watch collar-wearable communication device of claim 19, wherein the first and second receivers are respectively associated with first and second local wireless connections to a mobile radio.

21. The dual-watch collar-wearable communication device of claim 1, the set of functions further comprising routing audio received via the microphone via both the first channel and the second channel when both the left-side PTT button and the right-side PTT button are actuated.

22. The dual-watch collar wearable communication device of claim 21, wherein routing audio received via the microphone via both the first channel and the second channel comprises:

routing the received audio over one of the first channel and the second channel;

buffering the received audio; and routing the buffered audio over the other of the first channel and the second channel.

23. The dual-watch collar-wearable communication device of claim 1, further comprising a third PTT button, the set of functions further comprising routing audio received via the microphone via both the first channel and the second channel when the third PTT button is actuated.

24. The dual-watch collar wearable communication device of claim 23, wherein routing audio received via the microphone via both the first channel and the second channel comprises:

routing the received audio over one of the first channel and the second channel;

buffering the received audio; and routing the buffered audio over the other of the first channel and the second channel.

25. A method carried out by a dual-watch collar-wearable communication device that comprises left-side and right-side audio speakers, a microphone, and left-side and right-side push-to-talk (PTT) buttons, the method comprising:

routing audio received via a first channel to the left-side audio speaker;

routing audio received via a second channel to the right-side audio speaker;

routing audio received via the microphone via the first channel when the left-side PTT button is actuated; and routing audio received via the microphone via the second channel when the right-side PTT button is actuated.

* * * * *